July 23, 1968  L. W. JONES ETAL  3,393,902
ABSORPTION TOWERS
Filed April 15, 1965
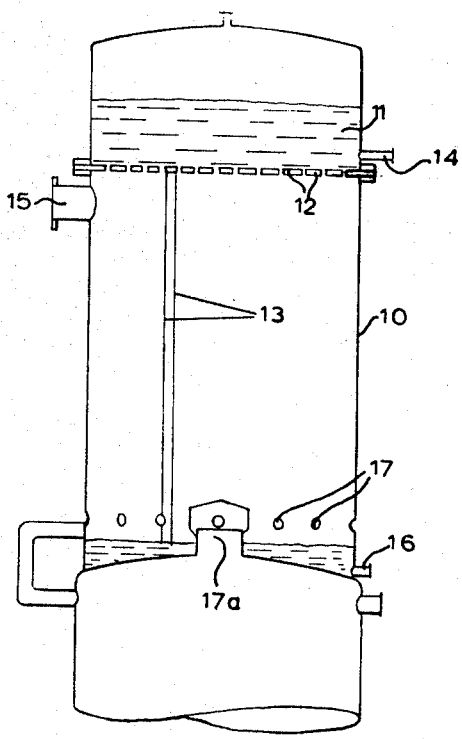

United States Patent Office 3,393,902
Patented July 23, 1968

3,393,902
ABSORPTION TOWERS
Leonard William Jones, Blackheath, and David Anthony Lihou, Birmingham, England, assignors to Wellman Incandescent Furance Company Limited, Smethwick, England, a British company
Filed Apr. 15, 1965, Ser. No. 448,484
2 Claims. (Cl. 261—117)

ABSTRACT OF THE DISCLOSURE

An absorption tower which includes a header tank arranged to hold a body of liquid in contact with the upper surface of a substantially horizontal and flat perforated plate, a contact chamber which has a sump in its lower end for collecting liquid, which is bounded at its upper end by the perforated plate, and which is closed except for at least one gas inlet, arranged immediately above the sump, and at least one gas outlet, arranged immediately below the perforated plate, the size of the perforations relative to the height of the contact chamber being such that liquid descends from each perforation to the sump in an undistintegrated stream.

Background of the invention

This invention relates to absorption or evaporation towers or columns which are commonly used in chemical manufacture for the purposes of scrubbing gases or vapours or for carrying out desired reactions particularly between gases or vapours on the one hand and liquids on the other hand, so as to recover the valuable material.

The usual practice in towers of this kind is to direct sprays of liquid downwardly and allow the gases or vapours to flow counter-current, i.e. upwardly through the tower, it being a normal desideratum to effect maximum intermixture and contact of the respective fluids so as to achieve maximum reaction or evaporation in the physical volume of the tower.

Typical examples of the uses of such towers (it being understood that the word "tower" is used herein in a wide sense) are the purification of coal gas by the removal of tar particles and ammonia by washing the gas with water, the recovery of iron sulphate by evaporation of pickling acid (in this case the tower must be an evaporation tower as well as an absorption tower), and the production of fluosilicic acid in a marketable form, i.e. the aqueous solution, by mixing the vapour of the acid coming off a recirculated mixture of phosphoric and fluosilicic acids, with water.

Summary of the invention

The objects of the present invention are to provide a new or improved tower which is advantageous in circumstances where it is preferred for the products of reaction or matter dissolved or entrained in the liquid after contact with the gas or vapour to be kept out of contact with the tower walls.

In accordance with the invention, a tower is provided with a header tank and a plurality of orifices for discharge of liquid into the tower, characterised in that the orifices are of such a size relative to the dimensions and operating conditions, that the liquid remains in undisintegrated streams throughout its passage from the orifices.

Amongst the factors which are important to the prevention of disintegration are the height of the orifices above the well or other area on which the streams impinge, since disintegration is primarily due to attenuation to a diameter insufficient to maintain coherence in the stream-form. It may be found for example that a stream emerging from a ¼" diameter orifice is reduced to ⅟₁₆" in diameter after a fall of a number of feet, but the quantitative value of the number will depend upon turbulence in the tower (due for example to the presence of directed jets of vapour of the incoming feed-stock to be scrubbed) the viscosity, temperature etc. of the liquid stream, the degree of vacuum or pressure in the tower and so on.

In all cases, simple experiment will usually suffice to determine the required orifice size for the purposes of the invention, and the smallest practicable orifice size is preferred concomitant with the essential of preventing stream disintegration.

Consequently, any material or heat transfer taking place in the tower occurs in the liquid stream so that the products of the mixture or reaction, or a concentrated liquor, are carried away to the well or the like for extraction. Hence, if the products are corrosive, corrosion of the tower walls is avoided: if the product is precipitable, precipitation on the tower walls is avoided: if the product is valuable, noxious or in any way not to be mixed and carried off out of the tower with unreacted vapours, such loss is avoided.

Brief description of the drawing

One preferred application of the invention is now more particularly described with reference to the accompanying drawing, wherein the sole figure is a largely diagrammatic elevation of a tower for use in fluosilicate production.

Description of the preferred embodiment

The tower shown in the drawing is applied to the production of water insoluble fluosilicates, for example of the metal sodium, by the reaction of an aqueous solution of the chloride of the metal containing slight excess of free hydrochloric acid, with fluosilicic acid vapours produced as a by-product of phosphoric acid or superphosphate production from phosphate rock.

The tower comprises a typically but not essentially cylindrical shell 10 having an integral header tank 11 with a horizontal plate 12 which forms the bottom of the header tank and which contains apertures or perforations forming descending undisintegrated streams 13 (only two of which are shown) with a liquid inlet 14, a vapour outlet 15, a scrubbed or reacted liquor outlet 16, and a series of vapour inlets located both peripherally (17), and centrally (17a). The portion of the tower below the header tank 11 constitutes a contact chamber which has a sump in its lower end for collecting liquid, and which is closed except for the vapour or gas outlet 15, located immediately below the header tank 11, and the vapour or gas inlets 17 and 17a located immediately above the sump. The contact chamber portion of the tower 10 is free from any obstruction in the path of the streams 13.

The insoluble salts may be extracted from the well and enable continuous production to be carried out.

The tower may be lined for corrosion resistance, for example with a rubber, in known manner.

Alternatively the well may have one or more stand pipes 17a projecting therethrough and no peripheral vapour inlets. Such pipe inlets or perforations may include shields to prevent admission of liquid by deflection, and to direct the vapours so that they do not disintegrate the streams. The flow could be crosswise and in such case the tower would be shorter vertically and the orifices smaller.

Conveniently the scrubber or evaporation tower forms the upper part of a structure of which the lower part forms either a reaction chamber, an enrichment chamber or even merely a storage chamber for the vapours to be admitted to the tower proper via the stand pipes or through connections to the perforations.

We claim:
1. An absorption tower comprising a header tank arranged to hold a body of liquid, a contact chamber below the header tank which has a sump in its lower end for collecting liquid and which is closed except for at least one gas inlet, arranged immediately above the sump, and at least one gas outlet, arranged immediately below the header tank, for exhausting gas from the tower, and a plurality of orifices leading from the header tank into the upper end of the contact chamber, the size of the orifices relative to the height of the chamber being such that liquid descends from each orifice to the sump in an undisintegrated stream, and the chamber being free from any obstruction in the path of such streams.

2. An absorption tower comprising a substantially horizontal and flat perforated plate, a header tank arranged to hold a body of liquid in contact with the upper surface of the perforated plate, a contact chamber which has a sump in its lower end for collecting liquid, which is bounded at its upper end by the perforated plate, and which is closed except for at least one gas inlet, arranged immediately above the sump, and at least one gas outlet, arranged immediately below the perforated plate, the size of the perforations relative to the height of the contact chamber being such that liquid descends from each perforation to the sump in an undisintegrated stream, and the chamber being free from any obstruction in the path of such streams.

References Cited
UNITED STATES PATENTS

| | | | |
|---|---|---|---|
| 565,036 | 8/1896 | Sands | 261—118 X |
| 630,506 | 8/1899 | Hirzel | 261—118 X |
| 1,028,157 | 6/1912 | Trinks | 261—113 |
| 1,671,110 | 5/1928 | Gibson | 261—113 |
| 2,767,967 | 10/1956 | Hutchinson | 261—113 |

BARRY B. THORNTON, *Primary Examiner.*

TIM R. MILES, *Assistant Examiner.*